United States Patent
Saito et al.

(10) Patent No.: US 7,722,223 B2
(45) Date of Patent: May 25, 2010

(54) LINE LIGHTING DEVICE AND IMAGE READING DEVICE

(75) Inventors: Tomihisa Saito, Tokyo (JP); Hidemitsu Takeuchi, Tokyo (JP); Takeshi Ishimaru, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 50 days.

(21) Appl. No.: 12/087,403

(22) PCT Filed: Dec. 22, 2006

(86) PCT No.: PCT/JP2006/325601

§ 371 (c)(1),
(2), (4) Date: Jul. 3, 2008

(87) PCT Pub. No.: WO2007/077760

PCT Pub. Date: Jul. 12, 2007

(65) Prior Publication Data

US 2009/0003000 A1    Jan. 1, 2009

(30) Foreign Application Priority Data

Jan. 5, 2006    (JP) .............................. 2006-000754

(51) Int. Cl.
*F21V 5/00* (2006.01)
(52) U.S. Cl. .............................. 362/311.06; 362/217.12
(58) Field of Classification Search ............ 362/311.01, 362/311.02, 311.6, 223, 217.1, 217.11, 217.12
See application file for complete search history.

(56) References Cited

U.S. PATENT DOCUMENTS 6,017,130 A * 1/2000 Saito et al. .................. 362/223
2003/0179420 A1   9/2003 Fujino

FOREIGN PATENT DOCUMENTS

| JP | 10-126581 A | 5/1998 |
|----|-------------|--------|
| JP | 2999431 B2  | 11/1999 |
| JP | 2001-005122 A | 1/2001 |
| JP | 2003-281913 A | 10/2003 |
| JP | 2004-320603 A | 11/2004 |

OTHER PUBLICATIONS

Japan Patent Office, ed., *Tokkyo kara Mita Kikai Yoso Binran* [*Kochaku*], 1st edition,(Sep. 25, 1980), p. 581.

* cited by examiner

*Primary Examiner*—David V Bruce
(74) *Attorney, Agent, or Firm*—Carrier, Blackman & Associates, P.C.; Joseph P. Carrier; William D. Blackman (57) ABSTRACT

A structure of a line lighting device permits a rod-like light guide to be attached to a case without rubbing against the case. An end portion of the rod-like light guide provided with a pin is inserted into an opening in a case main body and pushed down, thus making the pin engage with a recess in the case main body. At this time, a distal end of the rod-like light guide is inserted, to some extent, into an opening in a light emitting unit fixing portion. Subsequently, the rod-like light guide is pushed down and pivoted around the pin so as to be completely contained within the case main body. In this state, the distal end of the rod-like light guide is fitted into the opening and the end face of the rod-like light guide is flush with the outer side face of the light emitting unit fixing portion.

20 Claims, 10 Drawing Sheets

LINE LIGHTING DEVICE AND IMAGE READING DEVICE

CROSS-REFERENCE TO RELATED APPLICATIONS

The present application is a U.S. National phase of, and claims priority based on PCT/JP2006/325601, filed 22 Dec. 2006, which, in turn, claims priority from Japanese patent application 2006-000754, filed 5 Jan. 2006. The entire disclosure of each of the referenced priority documents is incorporated herein by reference.

TECHNICAL FIELD

The present invention relates to a line lighting device and an image reading device which includes the line lighting device.

BACKGROUND ART

Image reading devices such as facsimiles, copiers and image scanners include a line lighting device for lighting lines over a main scanning range of a paper surface. The line lighting device is a rod-like light guide contained within a case that has a light emitting unit (LED) fixed at one end, and is arranged so that light incident on an end face of the light guide is reflected within the light guide and emitted towards the paper from an exposed emitting face not covered by the case.

Figure 16:
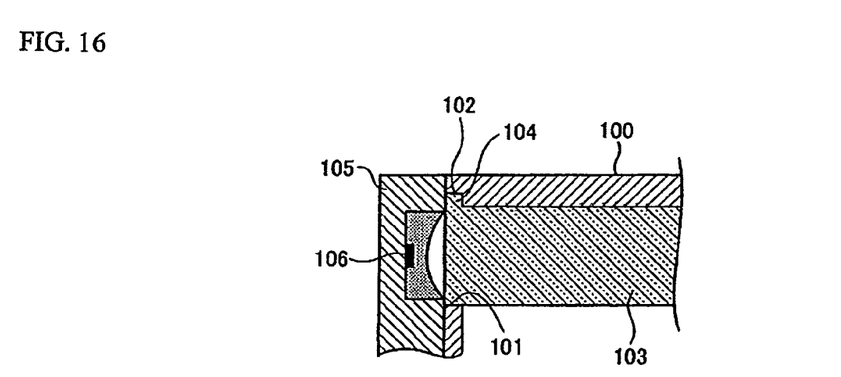
FIG. 16 is a cross-sectional view of a conventional rod-like light guide in state of being installed in a case.

The light guide has to be fitted into the case in such a way that a gap between the light emitting unit and a light guide end face which opposes the light emitting unit is accurately maintained. To this end, Patent Document 1 records an arrangement in which a recess 102 is formed in an opening 101 at one end of a case 100 and a protrusion 104 is formed at one end of the a rod-like light guide 103 to engage with the recess 102 so that the distance between the light guide end face and an LED 106 of the light emitting unit is constant, as shown in FIG. 16.

Figure 17:
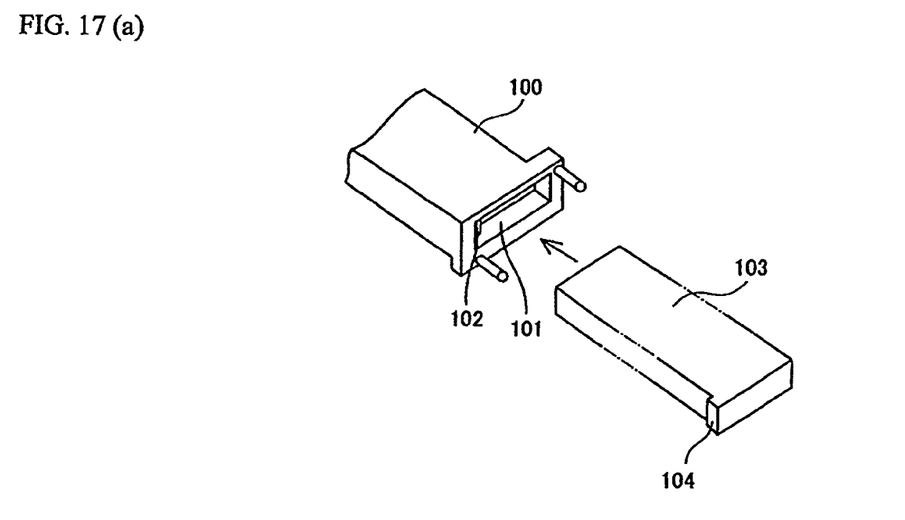
FIGS. 17(a) and 17(b) are diagrams for describing a conventional procedure for installing the rod-like light guide in the case.

The rod-like light guide 103 is easily fitted into the case 100 by firstly inserting the tip of the protrusion 104 into the opening 101 of the case 100. However, the presence of the protrusion 104 requires that the rod-like light guide 103 is inserted with the end not having the protrusion going first as shown in FIG. 17(a). Lastly, the protrusion 104 is engaged with the recess 102 as shown in FIG 17(b).

Patent Document 1: Japanese Patent No. 2999431

With the above-described conventional insertion method, surfaces over the entire length of the rod-like light guide may rub against the opening portion of the case, and be scratched. At scratched portions, light reflects in an irregular manner, adversely affecting the performance of the lighting device.

Also, great care must be taken when sliding the rod-like light guide, distal end first, into the case. Thus, the operation to fit the light guide requires both time and practice.

SUMMARY OF THE INVENTION

To solve the above-described problems, in the line lighting device of the present invention, a light emitting unit fixing portion is provided at an end of a case holding a rod-like light guide, an opening for insertably fitting an end of the rod-like light guide is formed in the light emitting unit fixing portion, a recess which is open at one end is formed in a portion of the case near the light emitting unit fixing portion, and a pin for engaging in the recess is formed on a side surface portion of the rod-like light guide near the end of the rod-like light guide.

Making the pin cylindrical and the recess U-shaped allows the insertion to be performed smoothly. In particular if the pin includes, on a side inserted into the recess, a tapered surface so as to narrow towards a distal end, it is easier to fit the light guide in the case when the distal end of the light guide is inserted.

According to the present invention, at the time of fitting the rod-like light guide into the case, there is no need to slide the entire length of the light guide into the opening of the case. A pin provided on a side surface at an end of the light guide is simply engaged in a recess in the case, and the light guide is pivoted around the pin. Consequently, the light guide is never scratched.

Moreover, the light guide can be fitted in a short time without displacement after fitting.

DETAILED DESCRIPTION OF BEST MODE FOR CARRYING OUT THE INVENTION

Figure 1:
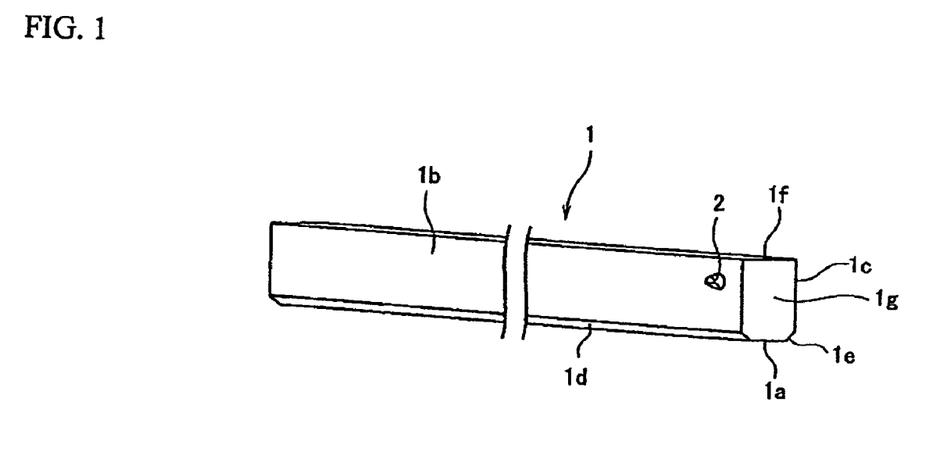
FIG. 1 is a view of an exemplary embodiment of an entire rod-like light guide of the present invention.
Figure 2:
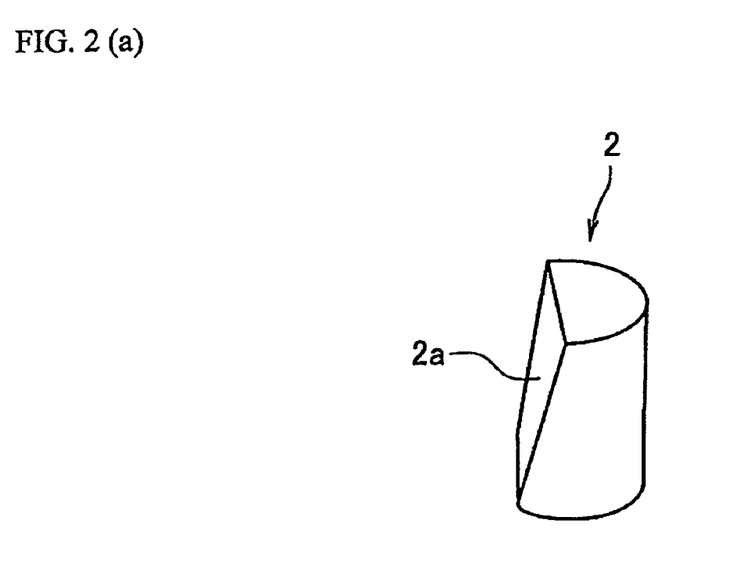
FIG. 2(a) is an exterior view of a pin provided on the rod-like light guide.
FIG. 2(b) is similar to FIG. 2(a), but shows an alternatively shaped pin according to another embodiment of the present invention.
Figure 3:
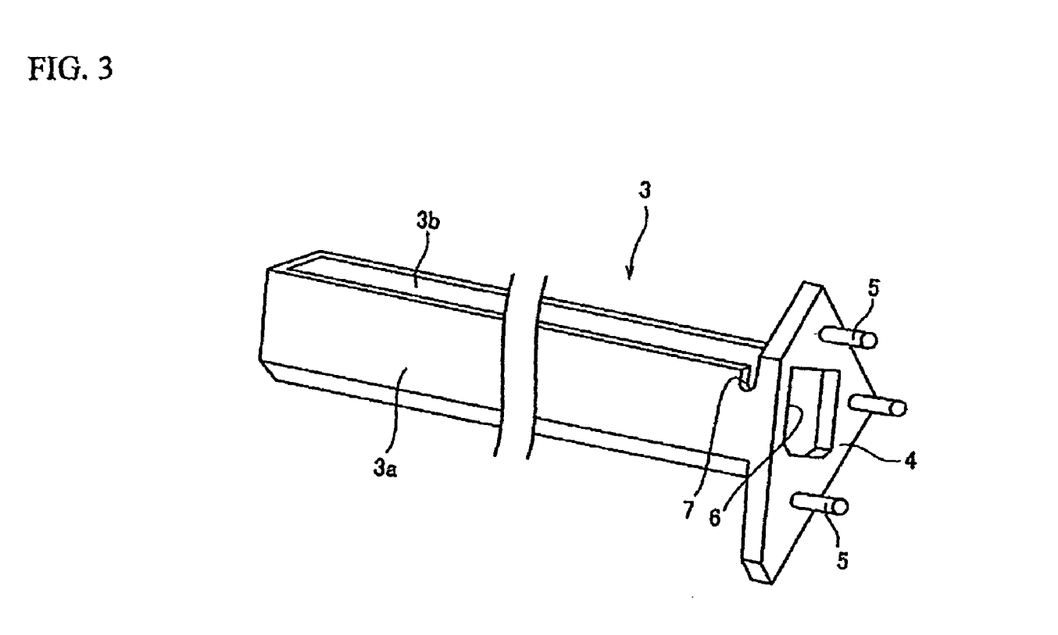
FIG. 3 is an exterior view of an exemplary embodiment of an entire case according to the present invention.

The following describes preferred embodiments of the present invention with reference to the drawings. FIG. 1 is an exterior view of an exemplary embodiment of the entire rod-like light guide included in the line lighting device of the present invention. FIG. 2 is a an enlarged view of a pin provided on the rod-like light guide, and FIG. 3 is an exterior view of an exemplary embodiment of the entire case included in the line lighting device of the present invention.

The rod-like light guide 1 is formed by injection molding a transparent resin such as an acryl resin or the like and has a six-sided end face based on a rectangle with sides corresponding to a bottom face 1a and two side faces 1b and 1c. Flat chamfers (C-chamfers) 1d and 1e are formed between the bottom face 1a and the respective side faces 1b and 1c. A light-reflection pattern (light scattering pattern) is formed on the bottom face 1a using a fine pattern of raised and lowered portions or a white coating. A top face 1f is an emission face and the chamfers 1d and 1e are set to an angle at which light is reflected from the bottom face 1a towards the top face (emitting face) 1f.

A pin 2 is formed on the side face 1b of the rod-like light guide at a portion near to the top face 1f and towards an end face 1g. The pin 2 is substantially cylindrical and has a tapered face 2a on the side of the bottom face 1a, so as to be thinner towards a distal end, as shown in FIG. 2(a). Alternatively, the pin 2 may be a truncated cone as shown in FIG. 2(b).

A case 3 which contains the rod-like light guide 1 is provided with an opening 3b which exposes the top face (emitting face) 1f of the rod-like light guide in a case main body 3a. A light emitting unit fixing portion 4 is provided so as to be integrated with the case main body 3a at one end thereof. Alternatively, the light emitting unit fixing portion 4 may be provided as a separate entity.

Pins 5 for fixing the light emitting unit including an LED, protrudes outwards from the light emitting unit fixing portion 4. The light emitting unit fixing portion 4 also includes an opening 6 for insertably fitting the rod-like light guide 1. The opening 6 is provided to prevent the rod-like light guide 1 from coming out of the case 3 after being fitted, and is shaped so as to substantially match a shape of the end face of the rod-like light guide 1. Note, however, that because the rod-like light guide 1 is inclined when insertably fitting the end thereof into the opening 6 as described in a later section, the opening 6 is made large enough to prevent seizing at this time.

Figure 4:
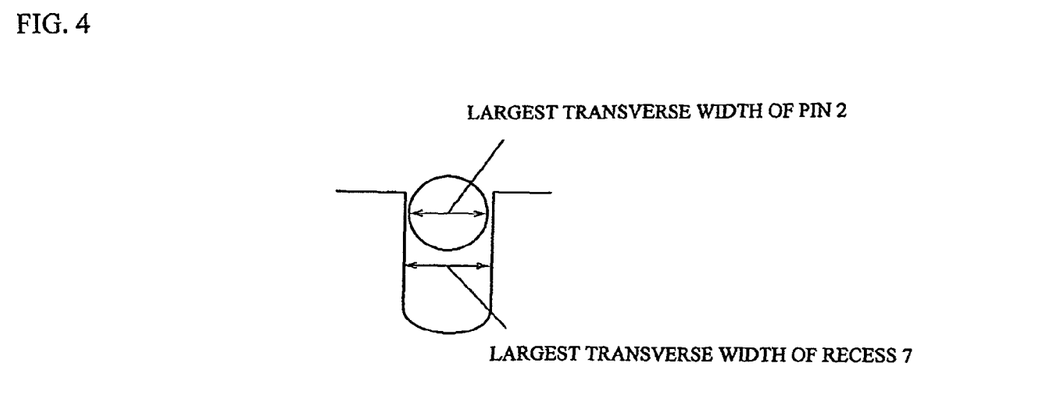
FIG. 4 is a diagram showing the relationship between a transverse width of the pin and a transverse width of a recess.

At a portion of the case main body 3a towards the light emitting unit fixing portion 4, a recess 7 with an U-shape is formed. The sizes of the recess 7 and the pin 2 are designed so that, when engaged, the largest transverse width (i.e. the largest width in the longitudinal direction of the light guide) of the recess 7 is larger than the largest transverse width (i.e. the largest width of the longitudinal direction of the light guide) of the pin 2 as shown in FIG. 4. A gap formed between the LED light emitting unit and the light guide affects the light intensity distribution of the lighting device. Thus, it is desirable that the gap formed is small. The size of the gap is determined by the degree of uniformity required across the lighting devices. Thus, the sizes of the pin 2 and the recess 7 are determined so that, when the light guide is fitted into the case, the gap between the light guide and the LED light source unit is of a size not exceeding the limit for securing the uniformity required in the lighting device.

The following describes a procedure for fitting the rod-like light guide 1 of the above construction in the case 3.

Figure 5:
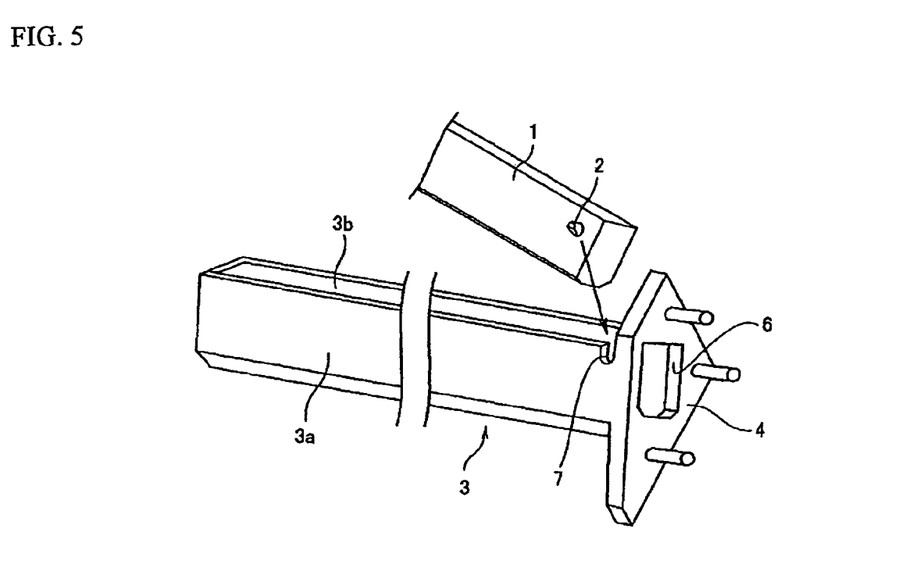
FIG. 5 is a diagram for describing a state immediately before the rod-like light guide is fitted into the case.

First, as shown in FIG. 5, the end of the rod-like light guide 1 provided with the pin 2 is inserted into the opening 3b of the case main body 3a and pushed down so that the pin 2 engages in the recess 7. At this time, a distal end of the rod-like light guide 1 is inserted, to some extent, into an opening 6 in a light emitting unit fixing portion 4.

Figure 6:
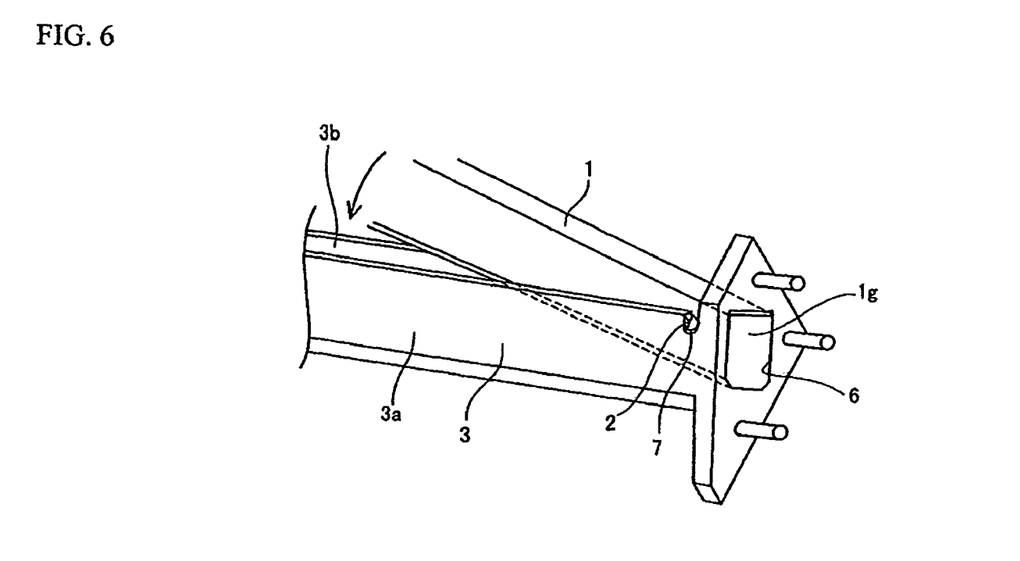
FIG. 6 is a diagram for describing a state in which the rod-like light guide is part-fitted into the case.

Thereafter, as shown in FIG. 6, the rod-like light guide 1 is pushed down and pivoted around the pin 2 until the entire rod-like light guide 1 is contained the case main body 3a. In this state, the distal end of the rod-like light guide 1 is fitted into the opening 6 and the end face of the rod-like light guide 1 is flush with a surface on the external side of the light emitting unit fixing portion 4.

Figure 7:
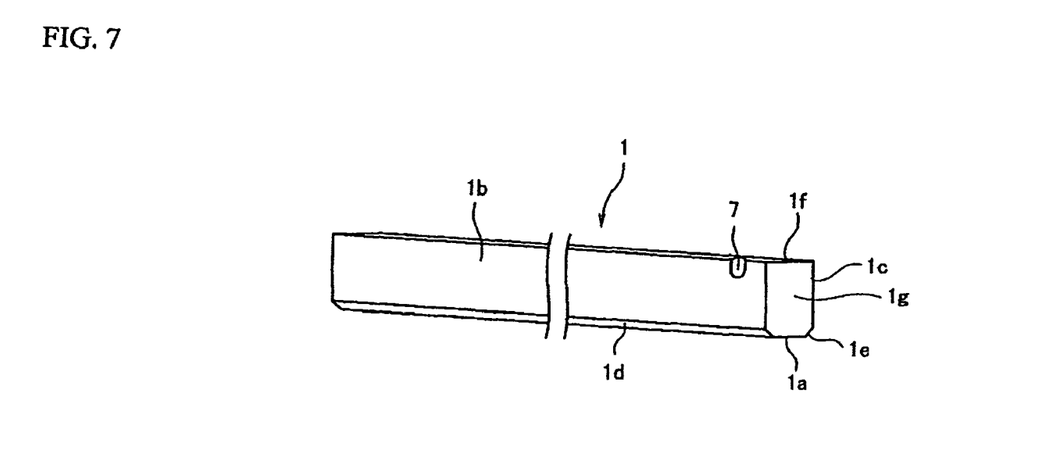
FIG. 7 is a diagram showing another exemplary embodiment of a light guide according to the present invention.
Figure 8:
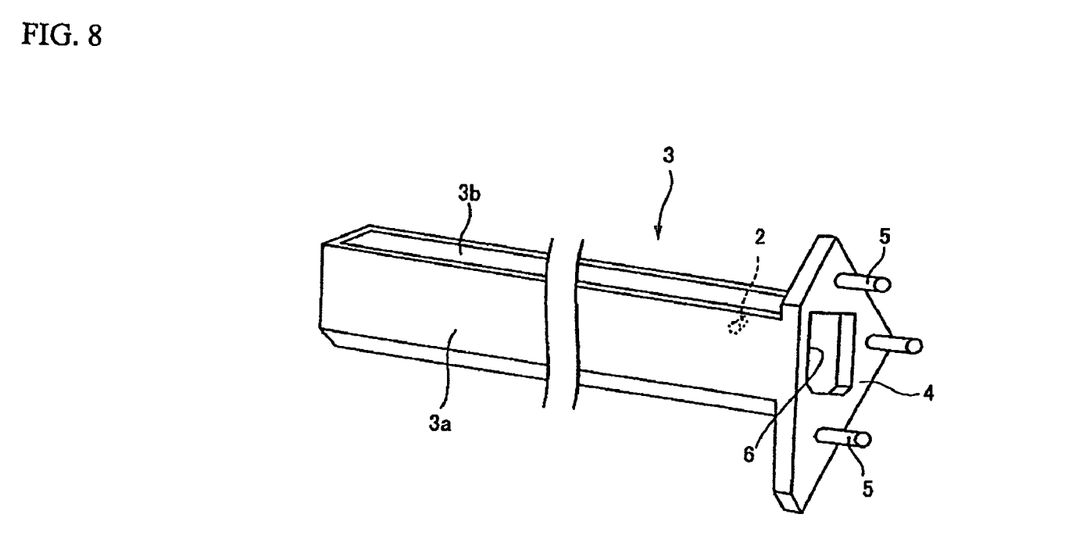
FIG. 8 is a diagram showing a another exemplary embodiment of a case according to the present invention.

FIG. 7 is a diagram showing another embodiment of a light guide. FIG. 8 is a diagram showing another embodiment of the case. As shown in FIGS. 7 and 8, a recess 7 for determining the transverse position of the light guide 1 may be provided on the light guide, and a pin 2 which engages with the recess 7 may be provided in the case 3.

The following describes preferable positions for the pin 2 provided on the light guide. For the pin 2, a position at which illuminating light from the LED (light emitting unit) is not directly irradiated on the protrusion is most preferable. Positions at which reflection of light from the LED directly irradiated on the protrusion does not affect a light intensity distribution in the effective lighting region (the region over which the lighting device illuminates the paper during reading of the image) are preferable. Positions which cause non-uniformity in the intensity distribution in the effective lighting region of the light guide are undesirable.

Rather than being directly emitted from the LED chip of the light emitting unit, light is reflected on the internal side of a window before exiting and is therefore emitted over the whole window. As a result, the spread of the light emitted from the light emitting unit and entering the light guide is ±90°. With an angle of incidence $\theta_1=90°$, $n_1=1$ (refractive index of air) and $n_2=1.49$ (refractive index of acryl), it can be stated from Snell's law that the maximum angle of refraction $\theta_2=42°$.

In other words, light incident on the light guide refracts at angles of up to approximately 42° measured from an extension of an edge of the light emitting unit window. No light with angles greater than 42° exists in the light guide. Hence, whether the pin position is inside or outside this 42° range determines whether or not refracted light hits the pin position.

Figure 9:
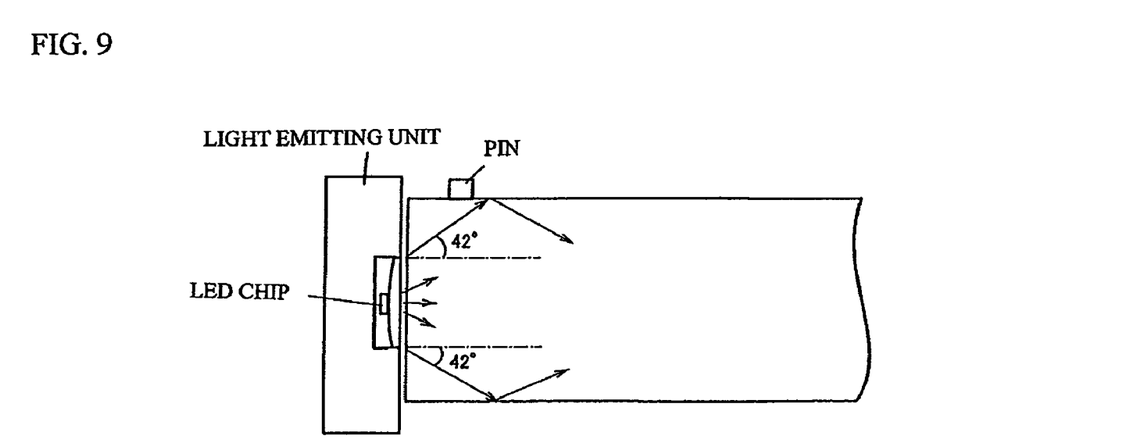
FIG. 9 is a diagram showing an example of a pin according to the present invention provided at a position which is not hit by light from a light emitting unit.
Figure 10:
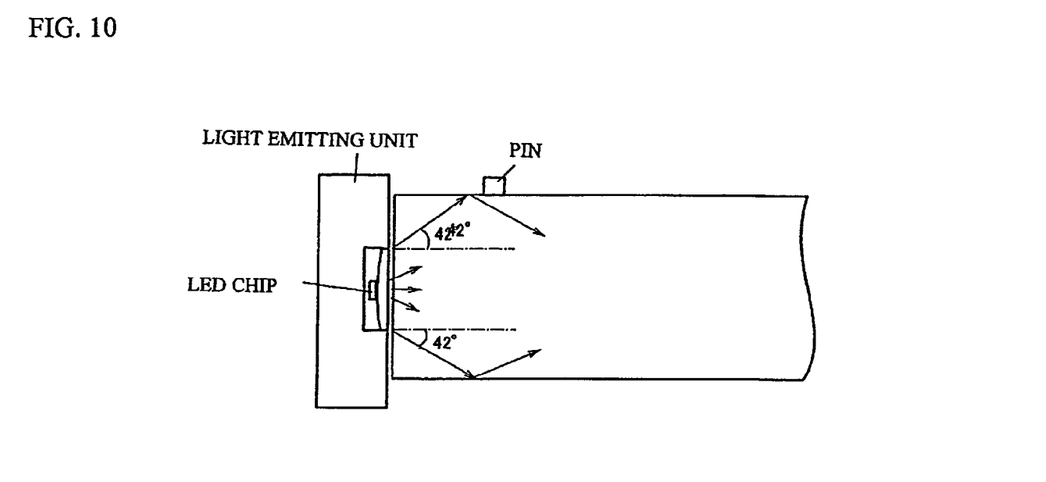
FIG. 10 is a diagram similar to FIG. 9, but showing an example of a pin provided at a position which is hit by light from the light emitting unit.

FIG. 9 is a diagram showing an example of the pin 2 provided at a position which is not hit by light from the light emitting unit. FIG. 10 is a diagram showing an example of the pin 2 provided at a position which is hit by light from the light emitting unit. If light from the light emitting unit does not hit the pin, the characteristics of the light guide are unaffected. If light from the light emitting unit does hit the pin, the characteristics of the light guide are affected.

In the case that the light hits the pin 2, brightness increases in the region of the pin. Thus, in a reading device, if a brighter portion is well-separated from the start of the effective lighting width, the brighter portion will not affect the characteristics of the reading device. Conversely, if the brighter portion is near the start of the effective lighting width, the brighter portion will affect the characteristics.

Note that, even if the pin is positioned in the effective lighting region of the light guide so that the light intensity distribution is non-uniform, it is possible to improve the uniformity of the light intensity pattern to some extent through suitable design of the scattering pattern (white ink pattern or pattern of raised and lowered portions) on the bottom portion of the light guide. For instance, since the light intensity is greater near the pin, use of a sparser light scattering pattern at a portion (near the pin) where light is incident is may be considered.

However, the pin is preferably positioned so that light from the above-described LED does not directly hit the protrusion or so that light from the LED directly hitting the protrusion is reflected in a manner which does not affect the light intensity distribution in the effective lighting region of the lighting device. This positioning is preferable because a uniform light distribution can be achieved without depending on the scattering pattern on the bottom portion of the light guide.

Figure 11:
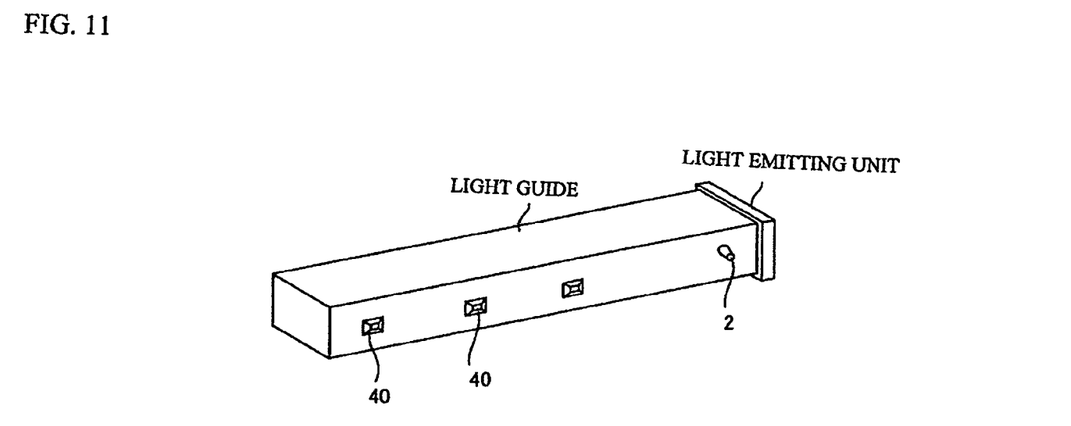
FIG. 11 is a perspective view of a rod-like light guide according to another exemplary embodiment of the present invention provided with vertical position-determining protrusions.
Figure 12:
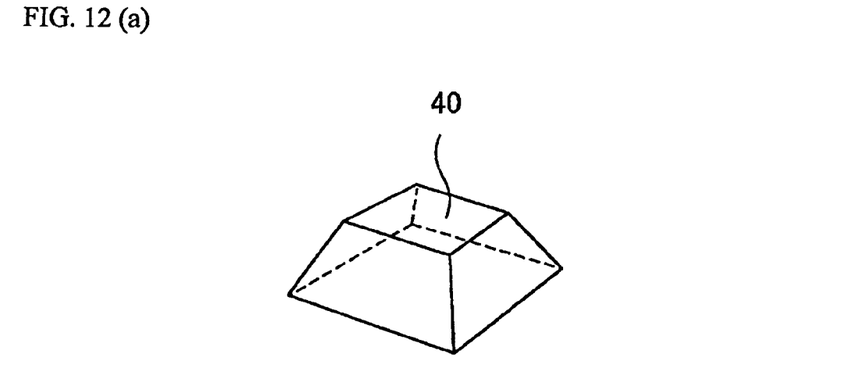
FIGS. 12(a) to 12(c) are perspective views of vertical position-determining protrusions according to exemplary embodiments of the present invention.
Figure 12C:
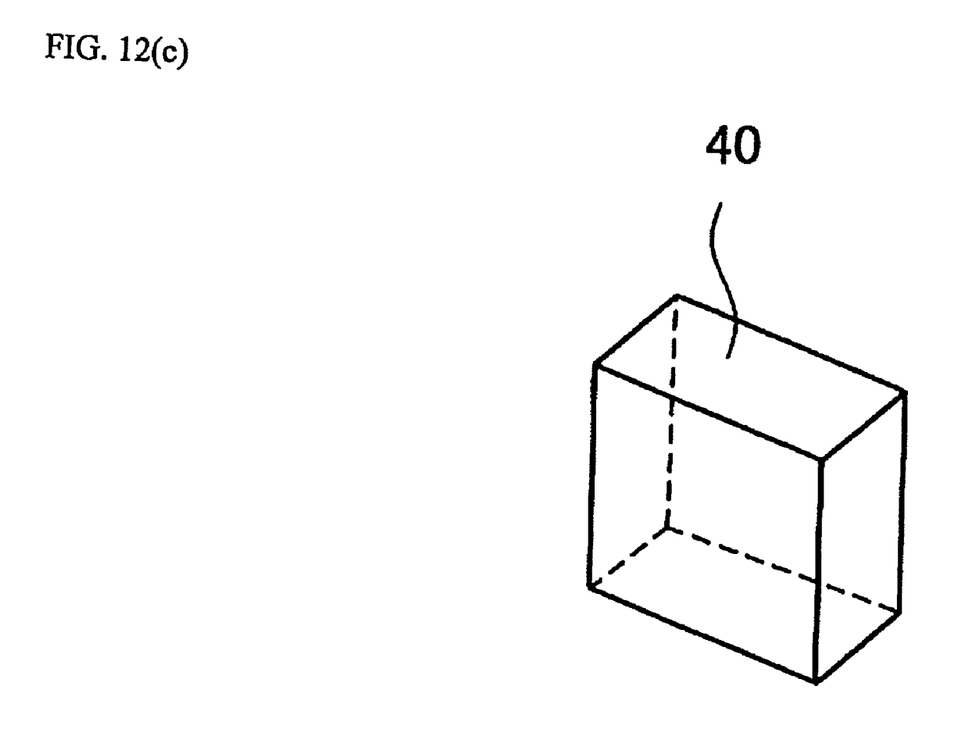

FIG. 11 is a perspective view of a rod-like light guide provided with vertical position-determining protrusions. FIGS. 12(a) to 12(c) are perspective views of vertical position-determining protrusions. One or more vertical position-determining protrusions 40 may be provided in addition to the transverse position-determining pin 2 (and recess 7). The one or more vertical position-determining protrusions 40 can include a reflective face. Alternatively, a light absorbing coating can be provided at the portion hit directly by light from the LED. For instance, the protrusions 40 may be entirely black. It is not desirable that the surfaces of the one or more protrusion are rough, since rough surfaces scatter directly hitting light from the LED, affecting the light intensity distribution of the lighting device.

Although one or more protrusions may be provided, a single protrusion is preferable because the position of a single portion can be easily determined. The pin 2 of the present invention is provided for determining a transverse position of the light guide. However, the provision of the one or more vertical position-determining protrusions 40 on the light guide improves the accuracy with which the light guide can be positioned, and is therefore preferable. The form of the vertical position-determining protrusion 40 is set to have allowance in the transverse direction when the protrusion 40 is engaged in a recess in the case. For instance, the protrusion 40 may have a triangular or trapezoidal cross section shown in FIGS. 12(a) to 12(c). Any number of the vertical position-determining protrusions may be used, and any positioning is acceptable. Preferably, however, the vertical position-determining protrusions are positioned further from the LED light source than the transverse position-determining protrusion. Increasing the distance of the vertical position-determining protrusions from the LED light source reduces the affect of light reflected from the vertical position-determining protrusions on the light intensity distribution of the lighting device. Hence, the vertical position determining protrusions are preferably positioned a large distance away from the LED light source.

Figure 13:
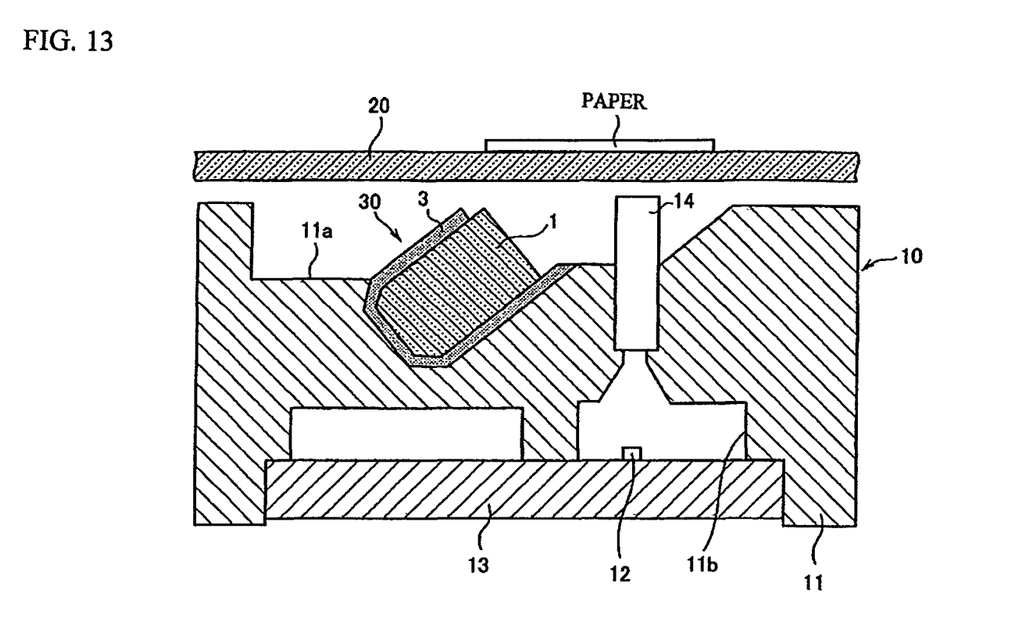
FIG. 13 is a cross-sectional view of an exemplary embodiment of an image reading device which includes one line lighting device of the present invention.
Figure 14:
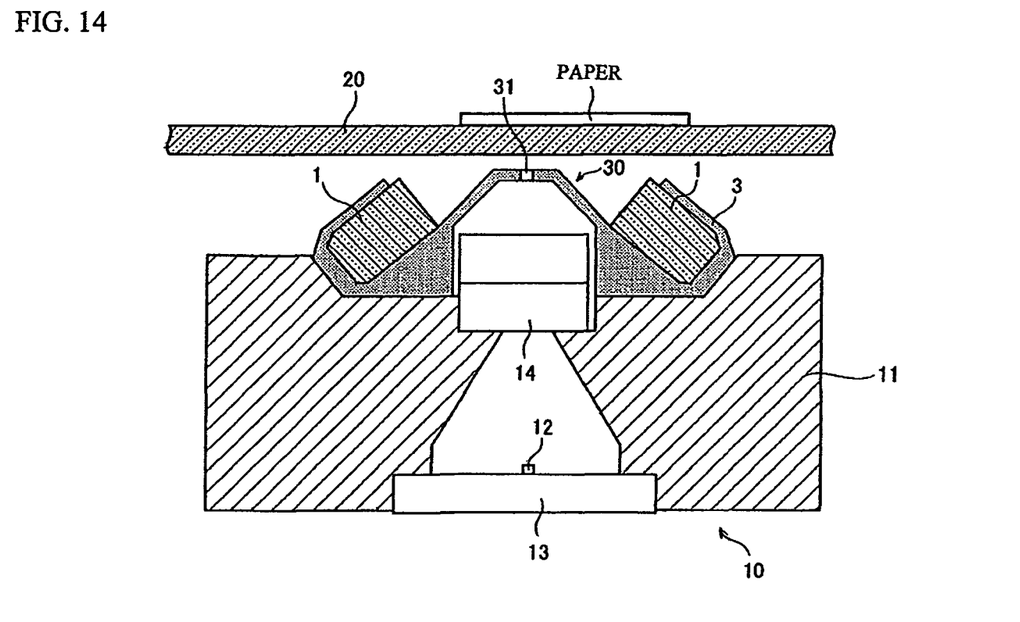
FIG. 14 is a cross-sectional view of an image reading device of another embodiment including two line lighting devices of the present invention.

FIG. 13 is a cross-sectional view of the image reading device including the line lighting device of the present invention. FIG. 14 is a cross-section of an image reading device of another embodiment. A contact type image sensor 10 moves parallel to a glass plate 20 on which the paper is sitting, and reads the paper. The contact type image sensor 10 has a casing 11, recesses 11a and 11b, in the recess 11a, a line lighting device 30 made up of the above-described rod-like light guide 1 held in the case 3, in the recess 11b, a sensor substrate 13 including a photoelectric conversion device (line image sensor) 12, and, in the casing 11, a rod lens array 14 for magnifying and focusing.

In the embodiment shown in FIG. 13, the case 3 and the casing 11 are formed as separate entities. However, the case 3 may be integrated with the casing 11 so as to form a portion therein.

In the contact type image sensor 10 shown in FIG. 14, a pair of right and left rod-like light guides 1 are held in a case 3 which constitutes a line lighting device 30. Fixing angles of the rod-like light guides 1 are set so that the axes of the rod-like light guides 1 meet at a position approximately corresponding to the surface of the paper.

A slit 31 is provided in the case 3 to restrict light reflected from the paper. A lens array 14 disposed below the slit 31 is formed by layering lens plates having multiple microlenses formed in surfaces thereof.

Figure 15:
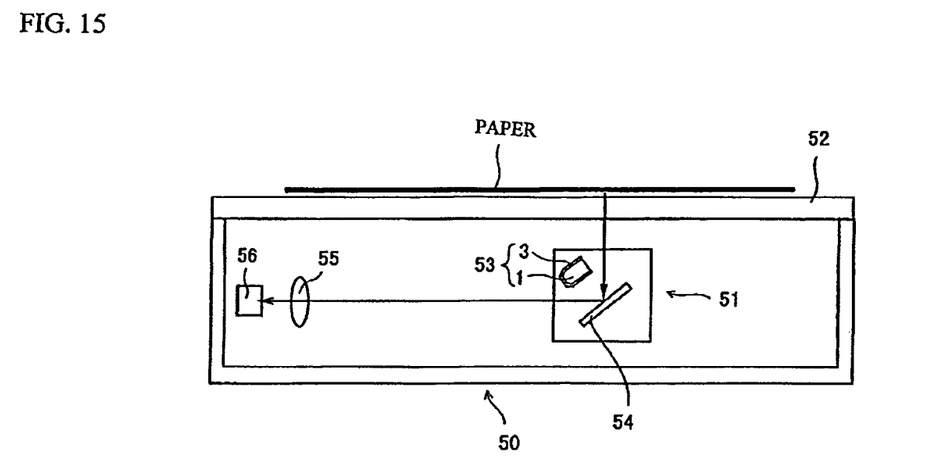
FIG. 15 is a cross-sectional view of an image reading device having a demagnification optical system.

Although the above has described embodiments of the invention in a contact type image sensor (contact image sensor), the lighting device of the present invention can be used in any image reading device having a demagnification optical system. An image reading device 50, which makes use of the demagnification-type image sensor 51, illuminates the paper placed on a transparent paper stand made of glass or the like, reflects the light reflected from the paper in a mirror 54, collects the light from the mirror 54 using a lens 55, and detects the collected light using a photoelectric conversion device 56, as shown in FIG. 15.

Note that, with regard to image reading devices having a demagnification optical system, "image sensor" is sometimes used to mean the photoelectric conversion device alone. In the present invention, however, the image sensor is used to mean the portion constructed from the lighting device, the mirror, the photoelectric conversion device and the lens.

Although there have been described what are the present embodiments of the invention, it will be understood that variations and modifications may be made thereto within the scope of the claims appended hereto.

The invention claimed is:

1. A line lighting device comprising:
a rod-like light guide held in a case so as to expose an emitting face of the rod-like light guide through an open, longitudinally-extending face of the case, wherein
a light emitting unit fixing portion is provided at an end of the case, an opening for insertably fitting an end of the rod-like light guide is formed in the light emitting unit fixing portion, a recess which is open at one end is formed in a portion of the case main body near the light emitting unit fixing portion, and a pin for engaging in the recess is formed on a side surface portion of the rod-like light guide spaced a distance away from an end face at the end of the rod-like light guide to be insertably fitted in the opening, said pin being configured to pivot in said recess when the light guide is rotatably inserted into the case through the open longitudinally-extending face of the case.

2. The line lighting device according to claim 1, wherein the pin is cylindrical and the recess is U-shaped.

3. The line lighting device according to claim 1, wherein the pin includes, on a side inserted into the recess, a tapered surface so as to narrow towards a distal end.

4. A contact type image sensor comprising
a casing containing the line lighting device according to claim 1, a line image sensor, and a lens array for focusing light reflected from paper or transmitted light onto the line image sensor.

5. The contact type image sensor according to claim 4, wherein
the case is formed so as to be integrated into the casing.

6. An image reading device including the contact type image sensor according to claim 4.

7. An image reading device having a demagnification optical system, the image reading device comprising
a casing containing the line lighting device according to claim 1, an image sensor, and a mirror and lens for focusing light reflected from the paper or transmitted light onto the image sensor.

8. The contact type image sensor according to claim 4, wherein the pin is cylindrical and the recess is U-shaped.

9. The contact type image sensor according to claim 8, wherein the case is formed so as to be integrated into the casing.

10. The contact type image sensor according to claim 4, wherein the pin includes, on a side inserted into the recess, a tapered surface so as to narrow towards a distal end.

11. The contact type image sensor according to claim 10, wherein the case is formed so as to be integrated into the casing.

12. An image reading device including the contact type image sensor according to claim 5.

13. An image reading device having a demagnification optical system, the image reading device comprising a casing containing the line lighting device according to claim 2, an image sensor, and a mirror and lens for focusing light reflected from the paper or transmitted light onto the image sensor.

14. An image reading device having a demagnification optical system, the image reading device comprising a casing containing the line lighting device according to claim 3, an image sensor, and a mirror and lens for focusing light reflected from the paper or transmitted light onto the image sensor.

15. The line lighting device according to claim 1, wherein the pin is positioned on the side surface portion of the light guide such that when the pin is engaged downwardly into the recess, the end of the light guide is insertably fitted into the opening in the light emitting unit fixing portion, and after the light guide is rotatably into the case the end face at the end of the light guide is substantially flush with an outer surface of the light emitting unit fixing portion.

16. The line lighting device according to claim 1, wherein the recess is formed completely through the case main body.

17. A line lighting device comprising:

a rod-like light guide held in a case so as to expose an emitting face of the rod-like light guide through an open, longitudinally-extending face of the case, wherein a light emitting unit fixing portion is provided at an end of the case, an opening for insertably fitting an end of the rod-like light guide is formed in the light emitting unit fixing portion, a recess which is open at one end is formed in a portion of the light guide spaced a distance away from an end face at the end of the light guide to be insertably fitted in the opening, and a pin for engaging in the recess is formed on a side surface portion of the case near the light emitting unit fixing portion, said pin being configured to pivot in said recess when the light guide is rotatably inserted into the case through the open longitudinally-extending face of the case.

18. The line lighting device according to claim 17, wherein the pin is cylindrical and the recess is U-shaped.

19. The line lighting device according to claim 17, wherein the recess is positioned on the side surface portion of the light guide such that when the pin is engaged downwardly into the recess, the end of the light guide is insertably fitted into the opening in the light emitting unit fixing portion, and after the light guide is rotatably into the case the end face at the end of the light guide is substantially flush with an outer surface of the light emitting unit fixing portion.

20. The line lighting device according to claim 17, wherein the recess is provided on the side surface portion of the light guide such that the open end of the recess is positioned at the emitting face of the light guide.

* * * * *

UNITED STATES PATENT AND TRADEMARK OFFICE
CERTIFICATE OF CORRECTION

PATENT NO. : 7,722,223 B2  Page 1 of 3
APPLICATION NO. : 12/087403
DATED : May 25, 2010
INVENTOR(S) : Saito et al.

It is certified that error appears in the above-identified patent and that said Letters Patent is hereby corrected as shown below:

Title page:
Item (54), the title, change "LINE LIGHTING" to --LINE-LIGHTING-- and change "IMAGE READING" to --IMAGE-READING--.
In section (56), References Cited, further under U.S. PATENT DOCUMENTS, after "6,017,130   A" delete "*" because Applicant first cited the reference in an Information Disclosure Statement dated 15 October 2008, and the examiner considered same. Examiner subsequently cited the same reference with the 23 October 2009 office action, more than a year later.
After "*Primary Examiner—*"change "David V" to --David V.--.
Item (57), ABSTRACT,
　　1st line, change "line lighting device" to --line-lighting device--;
　　7th line, change "opening in a light" to --opening in a light- --;
　　13th line, change "light emitting unit" to --light-emitting unit--.

Column 1:
Lines 1-2, change "LINE LIGHTING" to --LINE-LIGHTING-- and change "IMAGE READING" to --IMAGE-READING--.
Line 7, change "National phase" to --National Phase--.
Lines 9-10, change "patent application" to --Patent Application--.
Line 16, change "line lighting device" to --line-lighting device--.
Line 17, change "image reading device" to --image-reading device--.
Lines 17-18, change "line lighting device" to --line-lighting device--.
Line 22, change "image reading devices" to --image-reading devices--.
Line 23 and lines 24-25, change "line lighting device" to --line-lighting device--.
Line 26, line 32, and line 33, change "light emitting unit" to --light-emitting unit--.
Line 37, change "the a rod-like" to --a rod-like--.
Line 39, change "light emitting unit" to --light-emitting unit--.
Line 46, change "FIG 17(*b*)" to --FIG. 17(*b*)--.
Lines 59-60, change "line lighting device" to --line-lighting device--.
Line 60, line 63, and line 65, change "light emitting unit" to --light-emitting unit--.

Signed and Sealed this

Fourteenth Day of September, 2010

David J. Kappos
*Director of the United States Patent and Trademark Office*

Column 2:
  Line 38, change "showing a another" to --showing another--.
  Line 43 and line 46, change "light emitting unit" to --light-emitting unit--.
  Line 55, change "image reading device" to --image-reading device--.
  Lines 55-56, change "line lighting device" to --line-lighting device--.
  Lines 57-58, change "image reading device" to --image-reading device--.
  Lines 58-59, change "line lighting devices" to --line-lighting devices--.
  Lines 61-62, change "image reading device" to --image-reading device--.

Column 3:
  Line 7, change "line lighting device" to --line-lighting device--.
  Line 8, change "is a an enlarged view" to --is an enlarged view--.
  Line 11, change "line lighting device" to --line-lighting device--.
  Line 18, change "light scattering pattern" to --light-scattering pattern--.
  Line 34, line 36, line 38, line 39, line 40, and lines 49-50, change "light emitting unit" to --light-emitting unit--.
  Line 52, change "(i.e. the" to --(i.e., the--.
  Line 54, change "width (i.e." to --width (i.e.,--.
  Line 57, change "light emitting unit" to --light-emitting unit--.

Column 4:
  Lines 5-6, change "light emitting unit" to --light-emitting unit--.
  Line 9, change "is contained the case" to --is contained in the case--.
  Lines 12-13, line 22, line 32, line 35, line 42, lines 47-48, lines 49-50 (both occurrences), and line 52, change "light emitting unit" to --light-emitting unit--.

Column 5:
  Line 1, change "light scattering pattern" to --light-scattering pattern--.
  Line 2, change "is may be" to --may be--.
  Line 19, change "light absorbing coat-" to --light-absorbing coat- --.
  Line 44, change "reduces the affect" to --reduces the effect--.
  Line 47, change "position determining protrusions" to --position-determining protrusions--.
  Lines 50-51, change "image reading device" to --image-reading device--.
  Line 51, change "line lighting device" to --line-lighting device--.
  Line 52, change "cross-section of an image reading device" to --cross section of an image-reading device--.
  Line 53 and line 55, change "contact type image sensor" to --contact-type image sensor--.
  Lines 55-56, change "casing 11, recesses 11*a* and 11*b*," to --casing 11 and recesses 11*a* and 11*b*:--.
  Lines 56-57, change "line lighting device" to --line-lighting device--.
  Line 58, change "in the case 3," to --in the case 3;--.
  Line 60, change "sor) 12, and," to --sor) 12; and,--.
  Line 66, change "contact type image sensor" to --contact-type image sensor--.

Column 6:
  Line 1, change "line lighting device" to --line-lighting device--.
  Line 10, change "contact type image sensor" to --contact-type image sensor--.
  Line 12 and line 13, change "image reading device" to --image-reading device--.
  Line 20, change "image reading devices" to --image-reading devices--.
  Line 31, change "line lighting device" to --line-lighting device--.
  Line 35, line 37, and lines 39-40, change "light emitting unit" to --light-emitting unit--.
  Line 48 and line 51, change "line lighting device" to --line-lighting device--.
  Line 54, change "contact type image sensor" to --contact-type image sensor--.
  Line 55, change "line lighting device" to --line-lighting device--.
  Line 59, change "contact type image sensor" to --contact-type image sensor--.
  Line 62, change "image reading device including the contact type" to --image-reading device including the contact-type--.
  Line 64 and line 65, change "image reading device" to --image-reading device--.
  Line 66, change "line lighting device" to --line-lighting device--.

Column 7:
  Line 3, line 6, line 9, and line 13, change "contact type image sensor" to --contact-type image sensor--.
  Line 16, change "image reading device including the contact type" to --image-reading device including the contact-type--.
  Line 18 and line 19, change "image reading device" to --image-reading device--.
  Line 20, change "line lighting device" to --line-lighting device--.
  Line 24 and line 25, change "image reading device" to --image-reading device--.
  Line 26 and line 30, change "line lighting device" to --line-lighting device--.
  Line 34, change "light emitting unit" to --light-emitting unit--.
  Line 35, change "light guide is rotatably into the case" to --light guide is fitted into the case--.

Column 8:
  Line 2, change "light emitting unit" to --light-emitting unit--.
  Line 3 and line 5, change "line lighting device" to --line-lighting device--.
  Line 9, line 11, and line 17, change "light emitting unit" to --light-emitting unit--.
  Line 21 and line 23, change "line lighting device" to --line-lighting device--.
  Line 27, change "light emitting unit" to --light-emitting unit--.
  Line 28, change "light guide is rotatably into the case" to --light guide is fitted into the case--.
  Line 30, change "light emitting unit" to --light-emitting unit--.
  Line 31, change "line lighting device" to --line-lighting device--.